United States Patent [19]

Graichen et al.

[11] Patent Number: 5,224,410
[45] Date of Patent: Jul. 6, 1993

[54] POWER BOOSTER WITH VACUUM SUPPLY PASSAGE IN POSITION SENSOR HOUSING

[76] Inventors: Kai-Michael Graichen, Langen; Christof Kornas, Wiesbaden, both of Fed. Rep. of Germany

[21] Appl. No.: 730,942
[22] PCT Filed: Sep. 5, 1990
[86] PCT No.: PCT/EP90/01485
§ 371 Date: Jul. 30, 1991
§ 102(e) Date: Jul. 30, 1991

[30] Foreign Application Priority Data
Dec. 2, 1989 [DE] Fed. Rep. of Germany ....... 3939978
Feb. 9, 1990 [DE] Fed. Rep. of Germany ....... 4003957

[51] Int. Cl.$^5$ .................... F01B 25/26; F15B 9/10
[52] U.S. Cl. ................................. 91/1; 91/361; 91/369.1
[58] Field of Search .................. 91/1, 368, 369.1, 361; 92/5 R; 324/714, 716; 338/50, 103, 108, 116, 162, 196, DIG. 1

[56] References Cited

U.S. PATENT DOCUMENTS

| | | | |
|---|---|---|---|
| 3,155,188 | 11/1964 | Stoltman | 91/368 X |
| 3,970,985 | 7/1976 | Sage | 338/162 |
| 4,365,538 | 12/1982 | Andoh | 91/1 |
| 4,771,604 | 9/1988 | Nakano | 92/5 R X |
| 4,773,222 | 9/1988 | Tanaka et al. | 92/5 R X |
| 5,123,330 | 6/1992 | Roether et al. | 91/1 |
| 5,141,295 | 8/1992 | Burgdorf et al. | 92/5 R X |

FOREIGN PATENT DOCUMENTS

| | | | |
|---|---|---|---|
| 3815768 | 11/1989 | Fed. Rep. of Germany | 91/369.2 |
| 0109803 | 6/1983 | Japan | 324/714 |

Primary Examiner—Edward K. Look
Assistant Examiner—John Ryznic
Attorney, Agent, or Firm—Robert P. Seitter; J. Gordon Lewis

[57] ABSTRACT

A vacuum brake power booster with a connecting member (23) for the connecting nozzle (2) of the vacuum line and for the vacuum non-return valve (3). The connecting member is configured in the shape of a housing for a sensing device which detects the position of the diaphragm retainer (16) within the servo-cylinder (15). The sensing device consists of a scanning pin (22) which allows rotation of a gear (9) by means of a flexible toothed rack (6). The gear allows rotation of a tap (12) on an ohmic resistance. The different voltage values generated in this manner indicated the position of the diaphragm retainer within the servo-cylinder. By an appropriate selection of components, by their configuration, by their mutual adaptation, and by the appropriate assembly of these components into a compact overall assembly unit, the contour of a conventional vacuum brake power booster is not exceeded. The mounting space requirements of the booster are thus reduced. The booster is universally applicable.

59 Claims, 6 Drawing Sheets

POWER BOOSTER WITH VACUUM SUPPLY PASSAGE IN POSITION SENSOR HOUSING

FIELD OF THE INVENTION

The present invention relates to a brake power booster for brake systems with anti-lock and/or traction slip control. This brake power booster comprises a servo-cylinder and a servo-piston within the servo-cylinder, the position of the servo-piston in the servo-cylinder being detected by a sensing device. In particular, the invention relates to a vacuum brake power booster.

BACKGROUND OF THE INVENTION

The present invention can be applied to state-of-the-art vacuum brake power boosters as described, for example, in the Brake Handbook, 8th edition, Alfred Teves GmbH, herein incorporated by reference for its teachings in the field of brake systems. Specific reference to vacuum brake power boosters is found on pages 94 et seq. of this handbook.

The present invention also can be applied to brake systems which are equipped with anti-block and/or traction slip control. A pneumatic brake power booster for a brake system which has an anti-lock and/or traction slip control is described, for example, in German patent application No. P 3815768.3.

The aforesaid patent application discloses a pneumatic brake power booster, and in particular a vacuum brake power booster for a brake pressure control device. The patent specifically discloses an anti-block control device (ABS device) or a traction slip control device (TSC device) for automotive vehicles with a master cylinder, wheel cylinders, at least one pump for the positioning of at least one piston of the master cylinder, a pressure modulator which modulates the pressure in the wheel cylinders during the control modus, and an electronic controller which processes wheel sensor signals to actuating signals for the inlet valves and for the shut-off valves of the pressure modulator. The booster is comprised of a housing, a piston element, a diaphragm retainer in particular, and a diaphragm, preferably of a rolling diaphragm which sealingly connects the piston element to the housing and which permits movements of the piston element relative to the housing, the piston element being in active connection with the brake pedal.

It is proposed in the aforesaid German patent application that the housing, the piston element, in particular the diaphragm retainer, and the diaphragm preferably the rolling diaphragm, are configured as part of a travel switch for the control of the pump, in particular through the electronic controller.

It is shown by FIG. 4 of the German patent application that a travel sensor housing for a travel sensor 64 projects beyond the outer contour of the vacuum brake power booster.

SUMMARY OF THE INVENTION

It is an object of the present invention to eliminate the projection of the travel sensor from the contour of the booster.

Because of its outer contour, the inventive booster is virtually universally mountable.

The vehicle manufacturers repeatedly change their specifications regarding the mounting spaces for brake power boosters. These modifications involve the location, the size, and the configuration of the mounting space.

It is another object of the present invention to be able to adapt to changes of this kind without any major expenditure.

The inventive booster therefore offers maximum independence with regard to the space offered by the automotive vehicle manufacturers.

In addition, the booster housings can be standardized to a few standard types. Thus, a reduction in the mounting space requirements of the booster are realized.

Furthermore, the susceptibility of the vacuum brake power booster to strain during transport and assembly, due in particular to the projection of the travel sensor, is avoided.

It is a further object of the present invention to simplify the exchangeability and assembly of the vacuum brake power booster.

Moreover, the structural prerequisites are fulfilled by uniting the prior-art vacuum nozzle and the prior-art non-return valve with the sensor housing so as to form a compact assembly unit.

According to the invention, these and other objects are achieved by configuring one portion of the wall of the servo-cylinder in the shape of a housing for at least one part of the sensing device.

In a brake power booster with a connecting member for servo-fluid which is positioned in the wall of the servo-cylinder, it is proposed that at least part of the sensing device is accommodated within the connecting member.

In this context, the connecting member can be configured as a housing for at least part of the sensing device.

In one preferred embodiment, the sensing device is composed of a scanning member for the servo-piston which actuates a gearing of an electric element to generate a sensor signal (electric part) which is actuated by the gearing. At least part of the guide for the scanning member, the gearing, and the electric element are accommodated in the connecting member.

Along the lines of a further development of the aforesaid embodiment, the gearing comprises a flexible toothed rack and a gear which are in interacting connection with each other.

The scanning member may be comprised of a scanning pin which scans the position of the servo-piston and is connected to the flexible toothed rack, and a telescopic device to guide the scanning pin.

To ensure a safe contact in a determined range between the scanning pin and the servo-piston, it is proposed that a spring member, in particular a helical spring, is provided which keeps the scanning pin in abutment with the servo-piston through the gearing.

The electric part of the sensing device can consist of a rotary potentiometer which is actuated by the gear. The baseplate which will be described herein and the gear can be configured in one part.

The rotary potentiometer may be structured so as to be comprised of a baseplate which is fabricated of an electrically non-conductive material and on which an ohmic resistance in a circular arc-shaped configuration (not closed circuit) is accommodated, and a tapping member which is in physical contact with the ohmic resistance and which is adapted to perform a particularly circular arc-shaped movement relative to the ohmic resistance. Two alternatives are proposed in this context. According to the first alternative, the tapping member is arranged so as to be rotatable by the gear relative to the baseplate with the ohmic resistance. According to the second alternative, the baseplate with the ohmic resistance is arranged so as to be rotatable by the gear relative to the tapping member. If and when the material of the ohmic resistance is adapted to transmit force then a baseplate will be unnecessary. The ohmic resistance may also be positioned on the gear.

The above-mentioned connecting member, which is preferably made of plastic material, may be configured in the shape of a housing within which a common shaft for the gear and for the rotary potentiometer is accommodated. Furthermore, a slide rail for the toothed rack may be accommodated, particularly by being molded in, within the housing.

An especially compact design is achieved in that the connecting member is configured in the shape of an accommodating element for the vacuum non-return valve and/or for the vacuum connecting nozzle. In this context, the vacuum connecting nozzle is accommodated within the connecting member so as to be rotatable.

In order to safeguard against rotation of the connecting member with respect to the servo-cylinder, the connecting member is in a non-circular (e.g. elliptical or oval) configuration in the range of its coupling to the servo-cylinder. In another embodiment, the connecting member is configured in the shape of a housing and is positioned at a portion of the wall of the servo-cylinder in such a manner that the scanning pin performs paraxial movements with respect to the axis of the brake power booster. The connecting member may have a circular configuration. A safeguard against rotation is not indispensable. A low-cost assembly of the booster is achieved in that at its outer circumference and in the range of its connection with the opening in the wall of the servo-cylinder the connecting member is furnished with a buttoning-in collar preferably presenting a saw tooth-shaped external profile, and in that an elastic sealing plug is positioned between the opening in the wall of the servo-cylinder and the buttoning-in collar.

According to a further embodiment of the invention, the connecting member is configured as a vacuum connecting valve and is provided with a suction duct which ends up in a vacuum chamber, is positioned in a valve housing, and into which a movable element of the position sensor is introduced telescopingly, covering part of the cross sectional area of the suction duct. An opening already exists in the vacuum connecting valve due to the suction duct, into which the movable element of the position sensor can be introduced without any major difficulty. The diameter of the suction duct may be increased only slightly in order to make available an equal flow cross section for the air which flows out of the vacuum chamber.

Advantageously, the movable element is positioned centrally in the suction duct. As a result, the flow behavior within the suction duct will change only insignificantly. Furthermore, it will not be imperative in the event of assembly of the vacuum connecting valve to observe a determined angular position of the vacuum connecting valve in respect of the booster housing. The movable element will be in the same position in any angular arrangement.

In one preferred embodiment, a sensor is positioned in the vacuum connecting valve which generates an electric output signal depending on the position of the movable element. Indeed, an electric output signal is very easy to be conveyed onward and to be processed.

In this configuration, the electric signal may also be generated contactlessly by, for example, an inductive, capacitive or optical coupling.

In this embodiment, the sensor is configured in the shape of a resistance track on which a slider which is driven by the movable element slides. In other words, the position sensor is furnished with a potentiometer whose center tap is moved by the movable element. The voltage drop between the center tap, on one hand, and the one or the other connection of the potentiometer, on the other hand, will then allow drawing a conclusion on the position assumed by the movable element of the position sensor and, thus, of the diaphragm.

In another preferred embodiment, the electric sensor is provided with a plurality of contact surfaces which are separated from one another electrically and which in the event of a movement of the movable element come into contact one after the other with a movable contact being driven by the movable element. In this way, a continuous resolution of the position of the movable element will no longer be possible. This is, however, not necessary. For all normal applications it is sufficient when there is a possibility to find out whether or not the diaphragm retainer has assumed a position within one of several ranges. The resolution is influenced by the number of contact surfaces. Discrete signals will then be available at the output of the sensor which may, for example, also be processed further digitally.

In another preferred embodiment, the movable element is prestressed by a first spring in the direction of its position of rest. A telescopic element is positioned in the movable element which is prestressed in the direction of its position of rest by a second spring acting in the same direction, the second spring being much more rigid than the first spring. In this configuration, in its position of rest, the telescopic element projects out of the movable element and represents the element on which the diaphragm retainer acts. When the diaphragm retainer is moved into the vacuum chamber as a result of a movement of the brake pedal, initially, the movable element jointly with the telescopic element is moved contrasting the force of the first spring because the second spring is much more rigid than the first spring and practically creates a rigid coupling between the telescopic element and the movable element. When the first element reaches a stop, the telescopic element may be driven into the first element contrasting the force of the second spring. In this context, it is sufficient when the contact, i.e. the slider, is positioned at the movable element. In this way it is no longer possible to cover the total movement of the diaphragm retainer from one final position into the other. This is, however, not necessary. It is sufficient to monitor the position of the diaphragm retainer only within a determined range. Any movement of the brake pedal and thus of the diaphragm retainer beyond this range is unimportant for further processing.

In yet another preferred embodiment, the vacuum connecting valve is provided with a suction nozzle which extends at a predetermined angle with respect to the suction duct, the suction nozzle being rotatable relative to the housing. Thus, the suction nozzle does not project vertically out of the housing of the brake power booster. Rather, it extends parallel or at a slight angle, for example, with respect to the front side of the housing of the vacuum brake power booster. This reduces the space requirements and facilitates the assembly of a vacuum suction hose which extends, for example, from the engine air suction nozzle to the carburetor. Because the suction nozzle and the vacuum suction valve with its position sensor cannot be installed in the housing of the brake power booster and must be installed in a certain position, the suction nozzle is rotatable with respect to the valve housing. Thus, the suction nozzle points invariably into the same direction. The same holds true of an embodiment in which an electric connecting device is provided which is fixed to the valve housing and which is rotatable in its fixing position in respect of the valve housing. The mounting position of the vacuum connecting valve may also be independent of the position of the electric lines which are to be connected to the vacuum connecting valve for the electric supply of the position sensor and for the transmission of information from the position sensor.

In this context, the valve housing is preferably furnished with a plurality of sliding contact rings which are electrically connected to the sensor and the connecting device is provided with a corresponding number of sliding contacts which adhere to the sliding contact rings. This means that the sliding contact rings lead the electric supply and information connections to the surface of the vacuum connecting valve and once completely round about the vacuum connecting valve, so that the connecting device may be fixed in any angular position with respect to the valve housing.

The following advantages are offered by the invention:

The projection of the travel sensor from the contour of the booster is eliminated. The inventive booster is universally applicable.

The booster is largely independent of the space offered for it by the automotive vehicle manufacturer. In addition, a standardization of the booster housings to a few standard types is attained. The mounting space requirements are reduced in general.

The travel sensor thus forms a structural unit with the vacuum connecting valve. Accordingly, the contour of the housing of the brake power booster is no longer influenced by the travel sensor. The incorporation of the travel sensor in the housing of the brake power booster no longer affects the space requirements. The brake power booster may be handled and mounted with greater ease because fewer parts project outwardly. Furthermore, the travel sensor is given a protected accommodation within the vacuum connecting valve, so that the risk of damaging any projecting parts of the position sensor is minimized. No additional hole for the position sensor needs to be provided in the housing of the brake power booster. This facilitates the sealing of the brake power booster and reduces the risk of leakage in the vacuum chamber, which is, indeed, increased by each additional opening and which affects the safety of driving of the vehicle to a great extent. Finally, a considerable simplification of mounting results. The travel sensor may be pre-assembled in the vacuum connecting valve. The vacuum connecting valve can then be incorporated in the housing of the brake power booster for final assembly of the brake power booster.

Further details of the invention, of the objects and of the advantages offered will be revealed by the following description of one embodiment of the invention which is made with reference to ten figures.

DETAILED DESCRIPTION OF THE INVENTION

Figure 1:
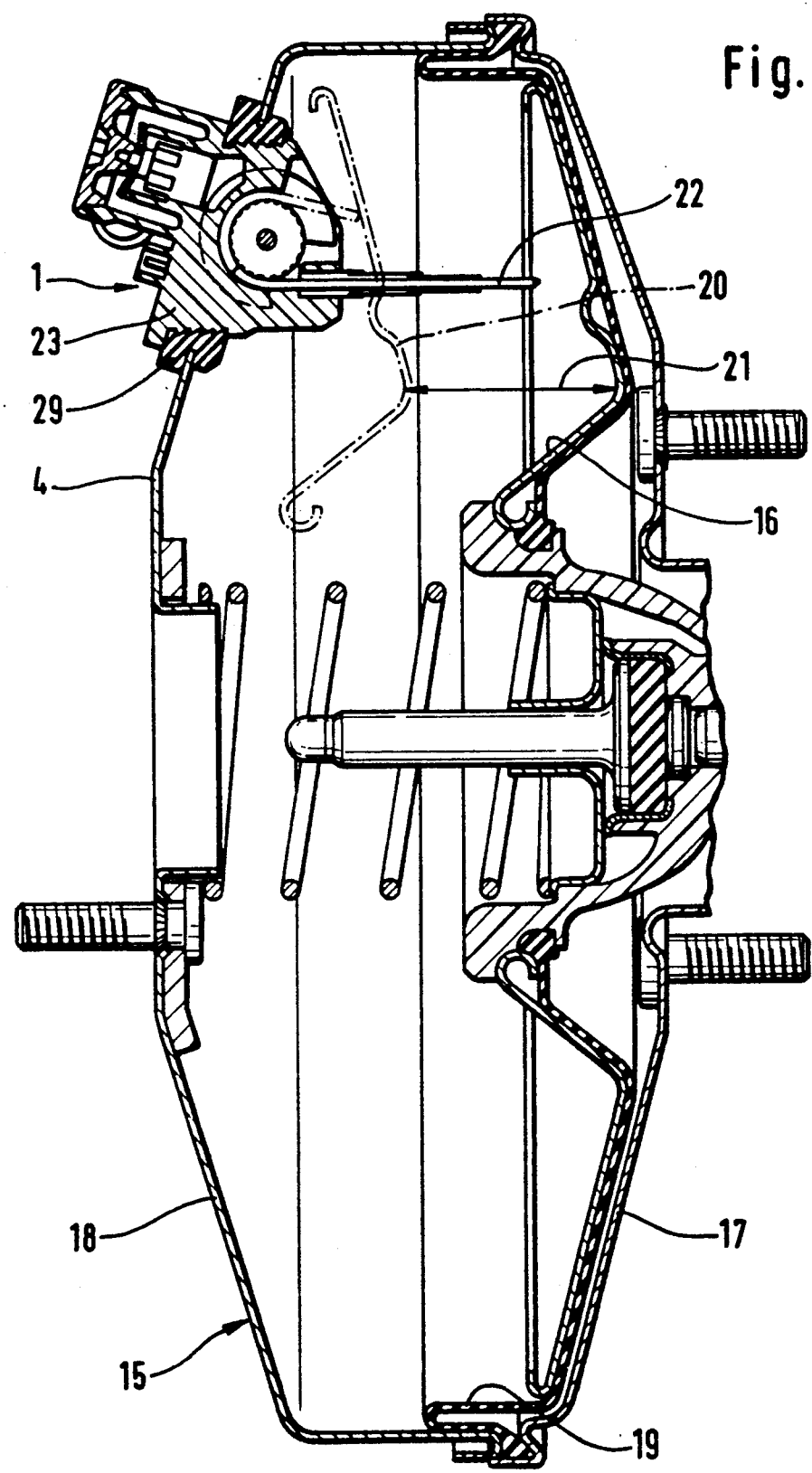
FIG. 1 shows the pneumatic servo-element of a vacuum brake power booster with a travel sensor housing in a sectional representation.

In FIGS. 1 to 4, a travel sensor is shown which is identified in its entirety by reference numeral 1. IT is combined with a suction nozzle, respectively with a vacuum connecting nozzle 2, see FIG. 2, and with a vacuum non-return valve 3, see FIG. 2. This combination is accommodated in the housing wall 4, see FIG. 1, of a vacuum servo-cylinder.

Figure 2:
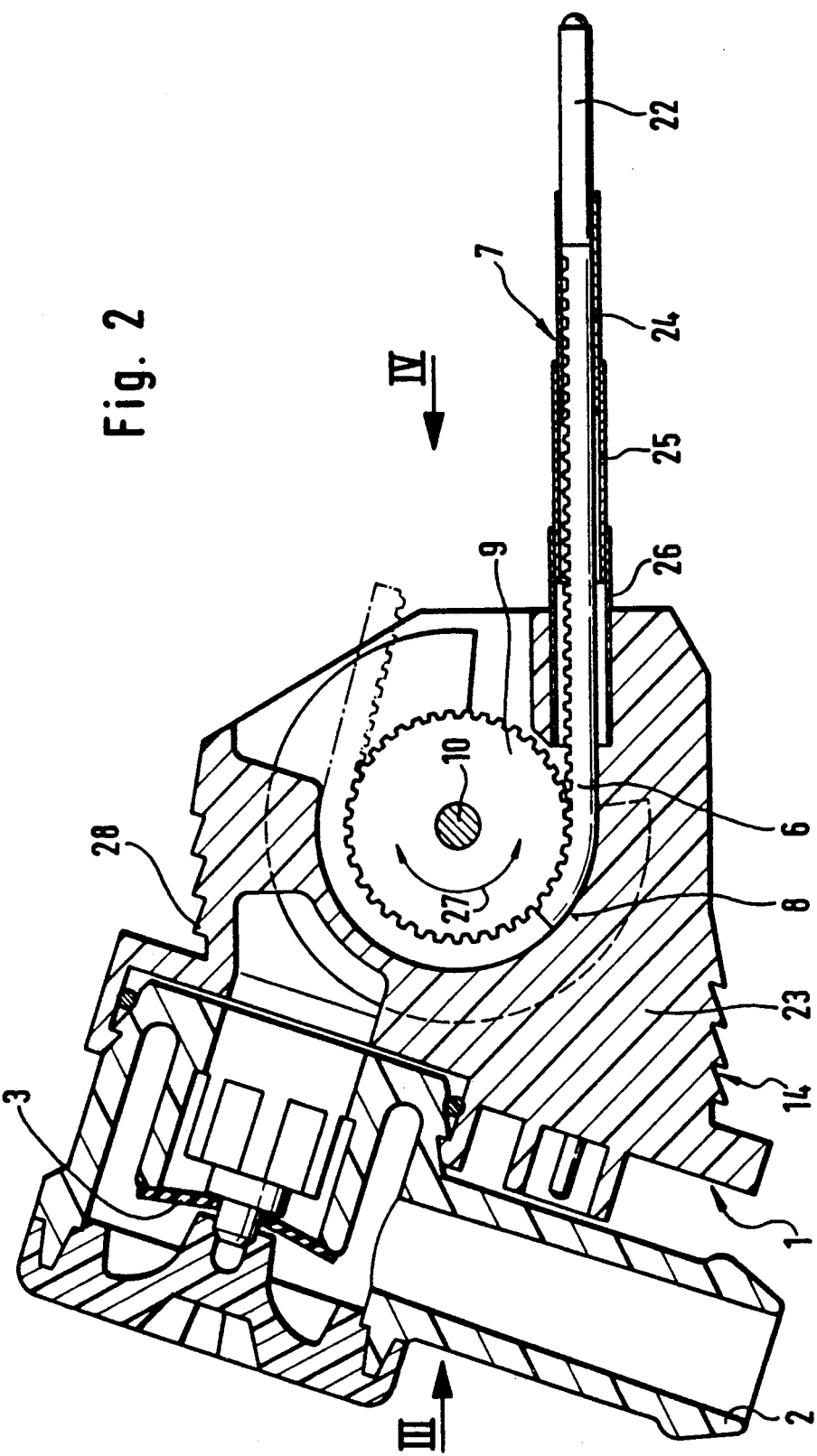
FIG. 2 shows a travel sensor housing with a vacuum non-return valve and a vacuum connecting nozzle in a sectional representation, the section running along the cross-sectional line II—II in FIG. 4.
Figure 4:
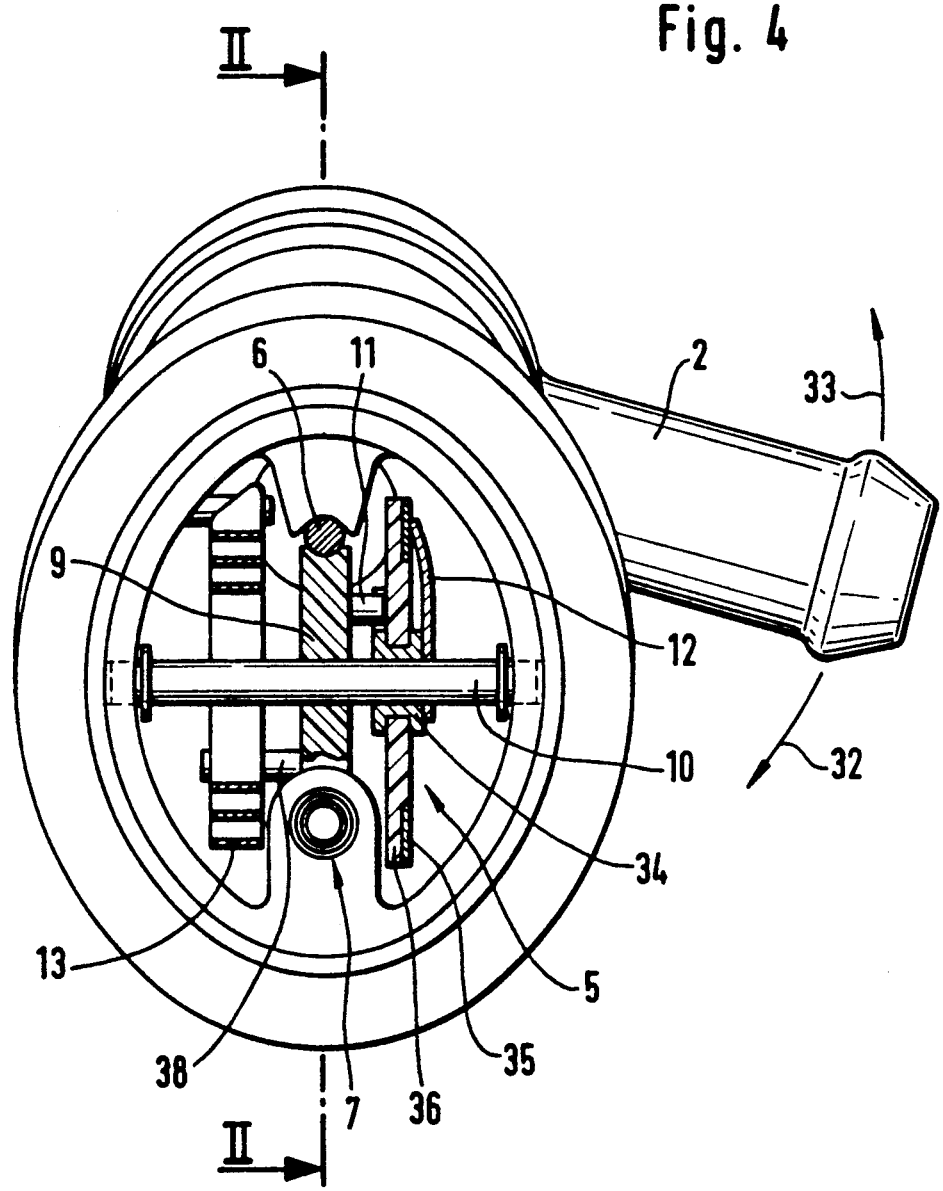
FIG. 4 shows a view, partially in section, of the subject matter of FIG. 2 in the direction of the arrow IV in FIG. 2.

The travel sensor is comprised of a rotary potentiometer 5, see FIG. 4, which is actuated by a flexible toothed rack 6, see FIG. 2, which is guided by a telescopic device 7.

The toothed rack is guided, beyond the telescopic device, also by a slide rail 8. The toothed rack rotates gear 9. Gear 9 rotates the tap 12 of the rotary potentiometer through an entrainment pin 11.

In addition, a helical spring 13 is provided which in the event of the release of the brake resets all actuating elements of the travel sensor without play.

The outer buttoning-in collar 14 of the travel sensor 1 has an oval shape as a safeguard against rotation.

In detail, the vacuum brake power booster shown in FIG. 1 is composed of the servo-cylinder which is identified in its entirety by reference numeral 15, and of a servo-piston 16.

The servo-cylinder consists of two cups 17, 18 which are coupled to each other in the range of their outer periphery. The servo-piston 16 is configured in the shape of a diaphragm retainer which is sealingly and axially moveably fixed in the servo-cylinder by means of a rolling diaphragm 19.

Two positions of the servo-piston, respectively of the diaphragm retainer are shown in FIG. 1 which bear the reference numerals 16, 20. Reference numeral 16 denotes the diaphragm retainer in its retracted right position when the brake is in the released condition. Reference numeral 20 denotes the position of the diaphragm retainer in its left extreme position. The double arrow 21 denotes the stroke of the diaphragm retainer.

Reference numeral 22 denotes a scanning pin which touches the diaphragm retainer only in the event of a braking action. In another embodiment, the scanning pin is permanently abutted with the diaphragm retainer.

Reference numeral 2 denotes the connecting member for the vacuum connection which is configured in the shape of a housing for the travel sensor. Reference numeral 29 is a sealing plug for the connecting member 23.

It will be seen from FIG. 2 that the scanning pin 22 is coupled to the flexible toothed rack 6. The toothed rack itself is guided in a telescopic device which is composed of three telescopic tubes 24, 25, 26. Further guidance of the flexible toothed rack within the housing 23 is safeguarded by the slide rail 8 which is molded in the housing.

As will be appreciated particularly from FIG. 2 and from FIG. 4, the toothed rack 6 mates with the gear 9. The potential directions of movement of the gear are indicated in FIG. 2 by the double arrow 27.

It will be seen from FIG. 2 that the buttoning-in collar which is denoted in its entirety by reference numeral 14 presents a saw-tooth profile 28. As is illustrated, the collar itself is designed oval-shaped or elliptical, to safeguard against rotation of the housing 23 with respect to the wall of the servo-cylinder.

A sealing plug 29 which consists of elastic material is positioned between the housing wall 4 and the housing 23.

Figure 3:
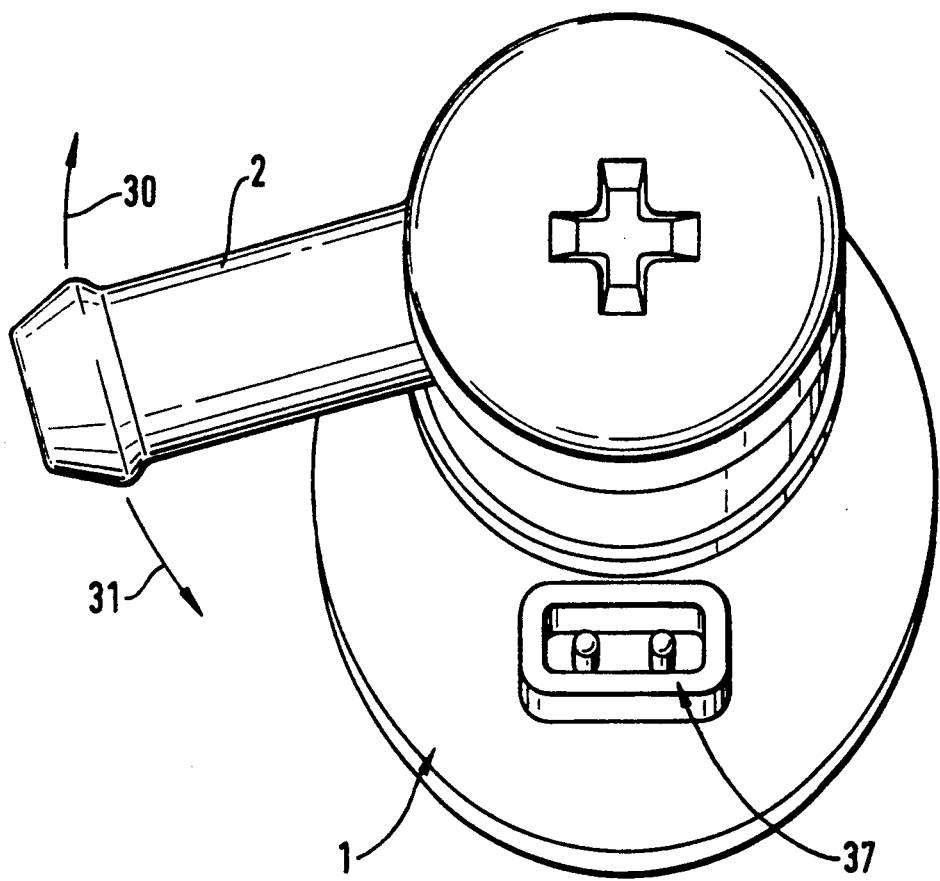
FIG. 3 shows a view of the subject matter of FIG. 2 in the direction of the arrow III in FIG. 2.

As shown by FIG. 2, a vacuum non-return valve 3 is fixed to the housing 23. A vacuum connecting nozzle 2 is attached to the non-return valve by molding. The assembly which is comprised of the non-return valve and of the vacuum connecting nozzle is rotatable with respect to the housing 23 of the travel sensor. This rotatability is illustrated in FIG. 3 by the arrows 30, 31 and in FIG. 4 by the arrows 32, 33.

Owing to the rotatability of the vacuum connecting nozzle, an easy adaptation to the mounting conditions predetermined by the automotive vehicle manufacturer, such as, for example, the dislocation of the vacuum line, is rendered possible.

The flexible toothed rack 6 is shown in a sectional representation in FIG. 4. As described above, it is in active connection with the gear 9, see FIG. 4. In the event of a rotation of the gear, the hub element 34 which is supported on the shaft 10 is rotated by means of the entrainment pin 11. The tap 12 is rigidly coupled to the hub element.

The tap 12 is in physical contact with the ohmic resistance 35 which is positioned on a baseplate 36 which consists of electrically non-conductive material and is coupled to the housing. A determined section of the ohmic resistance having a circular arc-shaped configuration will become effective depending on the position of the tap on the ohmic resistance. This will lead to different output voltages at the plug connection 37, see FIG. 3. These output voltages are measured values which indicate the position of the diaphragm retainer within the servo-cylinder.

As will be appreciated from FIG. 4, the gear 9 has a further entrainment pin 38 which is coupled to the one end of the helical spring 13.

The other end of the helical spring is coupled to housing 23. The helical spring acts in the sense that, as has been described above, the scanning pin is maintained in abutment against the diaphragm retainer through the gear and the flexible toothed rack.

In the embodiment described as yet, the baseplate consisting of non-conductive material and the ohmic resistance positioned on it are arranged stationarily within the housing, whereas the tap moves.

In another embodiment which is not illustrated in the drawings, the baseplate with the ohmic resistance is moved by the gear and that the tap is configurated as a stationary member.

In further embodiments of the invention, the inventive sensor housing may be designed without a vacuum non-return valve and without a vacuum connecting nozzle. A structural solution of this kind becomes convenient particularly when and if the vacuum non-return valve is to be arranged in the suction line in the range of the suction nozzle of the engine. In that case, the travel sensor housing is configured in such a way that it is practically positioned in the contour of the cylinder of the booster.

Figure 5:
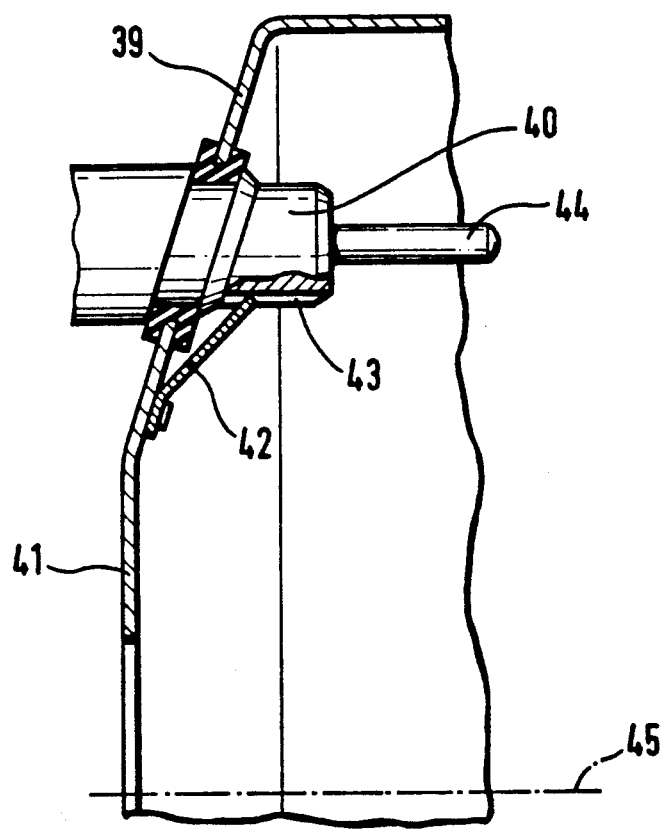
FIG. 5 shows an alterative arrangement of the travel sensor housing of FIG. 1.

A further embodiment of the invention is illustrated in FIG. 5. The connecting member 40 which is configured in the shape of a housing is disposed at a portion 39 of the wall 41 of the servo-cylinder in such a manner that the scanning pin 44 performs paraxial movements in respect of the axis 45 of the brake power booster.

The tongue 42 illustrated in FIG. 5 which projects into a groove 43 of the connecting member 40 represents another potential safeguard against rotation in case of an inclined housing and a circular connecting member.

Paraxial movements in case of a circular connecting member 40 are ensured, for example, even without safeguard against rotation in that the portion 39 of the wall 41 of the servo-cylinder is arranged such that it is disposed at right angles with the axis 45 of the brake power booster.

The particular advantage offered by this embodiment which is not shown in the drawing consists in that on rotation of the vacuum nozzle connected to the sensor housing 40, the scanning pin 44 remains paraxial in respect of the axis of the booster and does not assume an angular position.

Figure 6:
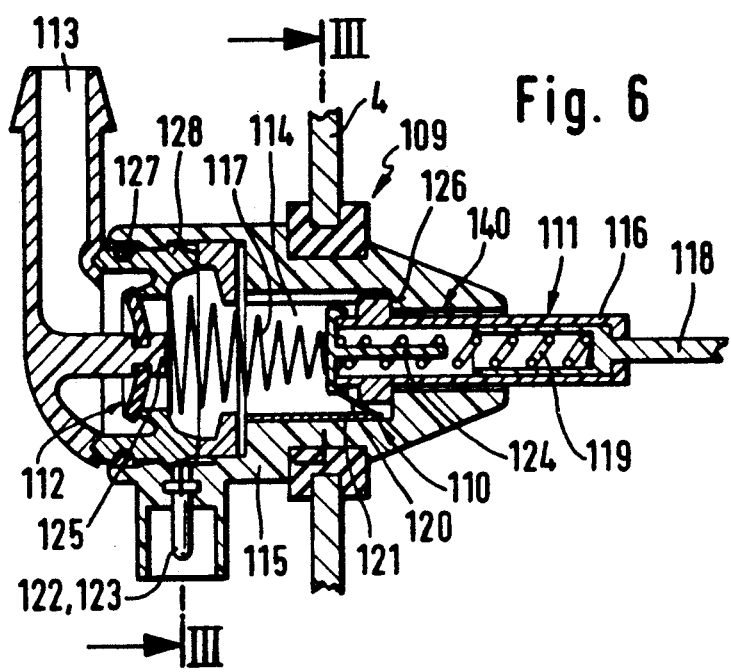
FIG. 6 shows another embodiment of the travel sensor with a vacuum non-return valve and a vacuum connecting nozzle in a sectional representation.
Figure 7:
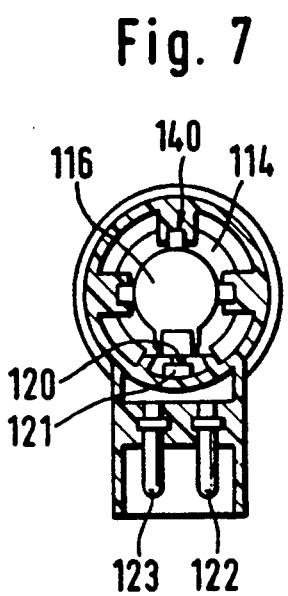
FIG. 7 shows a sectional view along the line III—III in FIG. 6.

A further embodiment of a vacuum connecting valve 109 is illustrated in FIGS. 6 and 7. The vacuum connecting valve is provided with a non-return valve 112 through which air may be aspirated over a suction duct 114 and a suction nozzle 113 from the vacuum chamber of the vacuum brake power booster which is not shown in the drawing. Suction duct 114 is positioned within a valve housing 115.

The travel sensor 110 which is accommodated within the valve housing 115 is comprised of a movable element 111 which, in the event of actuation, is in contact with the diaphragm retainer 16 shown in FIG. 1. In the position of rest of diaphragm retainer 16, a play between the movable element 111 and the diaphragm retainer 16 may exist. Upon actuation, the diaphragm retainer 16 is moved in the direction of the master brake cylinder (not shown in the drawing), urging the movable element 111 into the valve housing 115.

Movable element 111 is furnished with a first telescopic element 116 which is adapted to be telescoped into the housing 115, contrasting the force of a spring 117. During this operation, first telescopic element 116 is guided within the housing by supports 140. The first telescopic element 116 covers part of the flow cross sectional area of the suction duct 114 and is retained roughly centrally within the suction duct 114. The air aspirated from the vacuum chamber may flow off to the suction nozzle 113 through the annular slot which is formed between the first telescopic element 116 and the valve housing 115. The spring 117 takes support at a stop 125 which is formed in the housing, respectively, at an element which is rigidly coupled to the latter. Within first telescopic element 116, a second telescopic element 118 is positioned which is adapted to be telescoped into the first telescopic element 116. The second telescopic element 118 is retained in its position of rest by a second spring 119. In this configuration, second spring 119 is guided in its position by a guide stud 124. Second spring 119 is considerably more rigid than the first spring 117, that is to say, it has a considerably higher spring tension. When a force is brought to bear by the diaphragm retainer 16 on the second telescopic element 118, initially the first telescopic element 116 will be urged into the valve housing 115 against the force 117. On account of the elevated spring tension of the second spring 119, a practically rigid coupling comes about between the first telescopic element 116 and the second telescopic element 118. Only when the first telescopic element 116 cannot be urged further into the valve housing 115, for example because the first spring 117 is already completely compressed while the pressure on the second telescopic element 118 which is applied by the diaphragm retainer 16 is, however, increased further, then the second telescopic element 118 will move into the first telescopic element 116.

A slider 120 is fixed to the first telescopic element 116. The slider 120 is passed across a resistance track 121 in the event of a movement of the first telescopic element 116. The slider 120 and at least one end of resistance track 121 are each connected to one electric connection 122, 123. In the event of a movement of the slider 120, which is caused by a movement of the first telescopic element 116, the electric resistance between the connections 122, 123 will thus change. Then ,the current flow through the electric connections 122, 123, respectively and the voltage between them is a measure which indicates at which point the slider 120 has come to be positioned on the resistance track 121. At the same time, this will allow determining how far the first telescopic element 116 has been urged into the valve housing 115, which provides a determination of the position of the diaphragm retainer 16 and the brake pedal which is not shown in the drawing. Across the range of motion of the first telescopic element 116, the position of the slider 120 on the resistance track 121 is, indeed, a direct measure of the position of the diaphragm retainer 16 within the housing of the brake power booster. The movement of the telescopic element 116, to the right is limited by a stop 126 which is configured in the valve housing 115.

The suction nozzle 113 is locked in the valve housing 115, for example by a snap-type coupling 128. A seal 127 is positioned between the suction nozzle 113 and the valve housing 115, which prevents the vacuum generated within the suction nozzle 113 from being cancelled or attenuated again by the intake of air from the atmosphere. Suction nozzle 113 is disposed at an angle with respect to the suction duct 114. In the example illustrated, the angle is approximately 90 degrees. In this way, the suction nozzle 113 will be oriented nearly parallel to the front side of the booster housing 4.

A suction hose which is not shown in the drawing and which conveys the vacuum from the engine suction duct to the brake power booster can be pushed onto the suction nozzle 113 from above or from the side. The suction nozzle 113 is arranged rotatably in the valve housing 115 in order to achieve a preferred mounting position for the suction nozzle 113. This means that independently of the position of rotation of the valve housing 115 within the booster housing 4, the suction nozzle 113 will always allow adjustment such that it points, for example, in an upward direction. The aim achieved in this manner is that the electric connections 122, 123 and the suction nozzle 113 may be mounted in practically any angular position in respect of one another.

Figure 8:
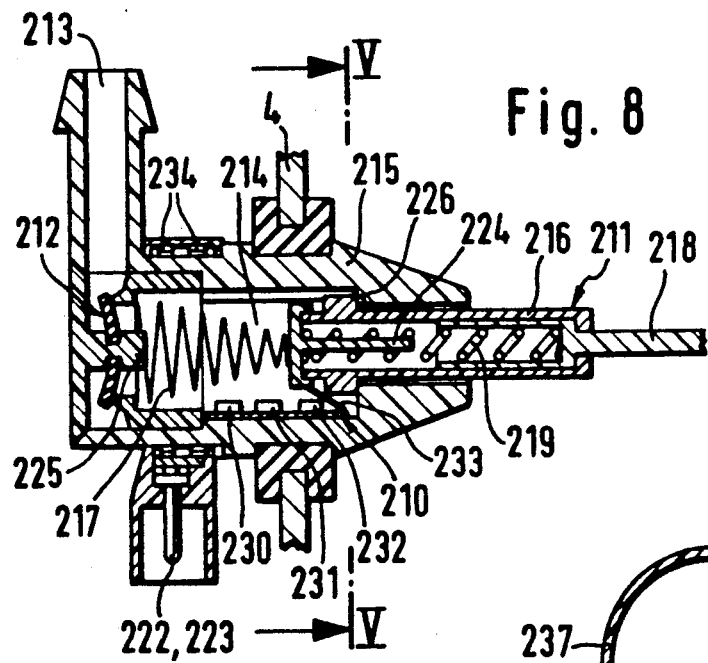
FIG. 8 shows a further embodiment of the travel sensor with a vacuum non-return valve and a vacuum connecting nozzle in a sectional representation.
Figure 9:
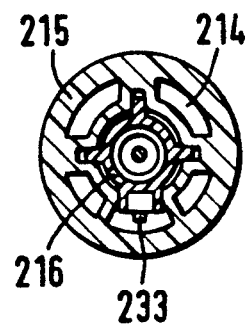
FIG. 9 shows a sectional view along the line V—V in FIG. 8.
Figure 10:
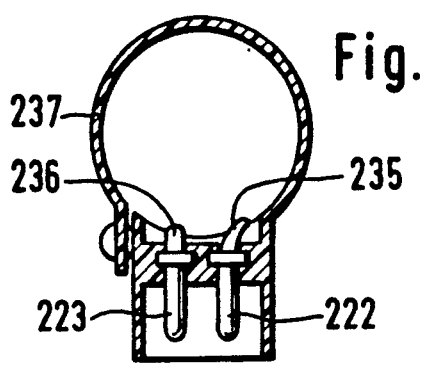
FIG. 10 shows an electric connecting device.

FIGS. 8 to 10 show another embodiment of a vacuum connecting valve, in which components which correspond to those in FIGS. 6 and 7 are given reference numerals increased by 100.

In contrast with the embodiment in FIGS. 6 and 7, the suction nozzle 213 is not disposed rotatably but stationarily at the valve housing 215. In order to achieve the result that the angular position between the suction nozzle 213 and the electric connections 222, 223 is adjustable at option, the electric connections 222, 223 are rotatable on the valve housing 215. For this purpose, two slide tracks 234 are provided on the surface of the valve housing 215 which extend in circumferential direction about the whole valve housing 215, their beginnings and their ends being connected to each other. An electric connector element 237 is furnished with sliding contacts 235, 236 which are connected to the electric connections 222, 223. The sliding contacts 235, 236 slide on the two slide tracks in any angular position of the connector element 237 and, therefore, ensure the electric contact between the slide tracks 234 and the electric connections 222, 223 in any angular position.

Three contact surfaces 230, 231, 232 which are separated from one another are provided in lieu of the slide track 234 of the first embodiment. The distances between the individual contact surfaces 230, 231, 232 are shown exaggerated in FIG. 8. In reality, the contact surfaces are very close to one another, being, however, electrically isolated from one another. At the first telescopic element 216, a movable contact 233 is provided which is rigidly coupled to the first telescopic element 216. When the movable element 211 moves, the movable contact will come in contact with the contact surfaces 232, 231, and 230 one after the other. Making contact between the movable contact and the contact surfaces allows electrical monitoring. When and if, for example, the movable contact 233 is in contact with the contact surface 231, then this will indicate how far the movable element 211 has been urged into the housing 115 and, thus, it will indicate movement performed by the diaphragm retainer 16, respectively by the brake pedal. The currents flowing through the contact surfaces 230, 231, 232, respectively and the voltage drops taking place at resistances which are connected with the contact surfaces, furnish the information about which the contact surface is in contact with the movable contact 233 at any given moment. Since discrete values are used here, these values will, indeed, easily allow further digital processing

We claim:

1. A brake power booster for brake systems with anti-lock and/or traction slip control, which comprises a servo-cylinder having a wall defining a portion of a housing of said servo-cylinder and a servo-piston within said servo-cylinder housing, the position of said servo-piston in said servo-cylinder housing being detected by a sensing device characterized in that a portion of the wall of said servocylinder is configured as a sensing device housing for at lest part of said sensing device, and a connecting member for a servo-fluid is positioned in the wall of said servo-cylinder, which connecting member accommodates at least part of said sensing device.

2. A vacuum brake power booster as claimed in claim 1 characterized in that said connecting member is configured as a housing for at least part of said sensing device.

3. A brake power booster as claimed in claim 2, characterized in that said movable element is positioned centrically within said suction duct.

4. A vacuum brake power booster as claimed in claim 1, characterized in that said sensing device is composed of a scanning member which actuates a gearing, of an electric element to generate a sensor signal, which is actuated by said gearing, in that at least part of the guide for said scanning member, said gearing, and said electric element are accommodated in said connecting member.

5. A vacuum brake power booster as claimed in claim 4, characterized in that said gearing comprises a flexible toothed rack and a gear which are in interacting connection with each other.

6. A vacuum brake power booster as claimed in claim 5, characterized in that said scanning member is comprised of a scanning pin which is connected to said flexible toothed rack and of a telescopic device to guide said scanning pin.

7. A vacuum brake power booster as claimed in claim 1, characterized in that a spring member is provided which keeps said scanning pin in abutment with said servo-piston through said gearing.

8. A vacuum brake power booster as claimed in claim 7, characterized in that said electric part consists of a rotary potentiometer which is actuated by said gear.

9. A vacuum brake power booster as claimed in claim 8, characterized in that a baseplate for the said rotary potentiometer is provided which forms one component together with said gear.

10. A vacuum brake power booster as claimed in claim 9, characterized in that said rotary potentiometer is comprised of said baseplate which is fabricated of an electrically nonconductive material and on which an ohmic resistance of particularly circular arc-shaped configuration is accommodated, and of a tapping member which is in physical contact with said ohmic resistance and which is adapted to perform a particularly circular arc-shaped movement relative to said ohmic resistance.

11. A vacuum brake power booster as claimed in claim 10, characterized in that said tapping member is arranged so as to be rotatable by said gear relative to said baseplate with said ohmic resistance.

12. A vacuum brake power booster as claimed in claim 10, characterized in that said baseplate with said ohmic resistance is arranged so as to be rotatable by said gear relative to the said tapping member.

13. A vacuum brake power booster as claimed in claim 10, characterized in that said ohmic resistance is positioned on said gear.

14. A vacuum brake power booster as claimed in claim 10, characterized in that said gear and said rotatable baseplate of said rotary potentiometer are configurated one-part.

15. A vacuum brake power booster as claimed in claim 6, characterized in that said connecting member is configured as a housing and is positioned at a portion of the wall of said servo-cylinder in such a manner that said scanning pin performs paraxial movements in respect of the axis of the brake power booster.

16. A vacuum brake power booster as claimed in claim 8, characterized in that said connecting member is made of plastic material and is configured as a hosing within which a common shaft for said gear and said rotary potentiometer is accommodated.

17. A vacuum brake power booster as claimed in claim 16, characterized in that said connecting member is configured as a housing within which a slide rail for said toothed rack is accommodated.

18. A vacuum brake power booster as claimed in claim 1, characterized in that said connecting member is configured as an accommodating element for a vacuum non-return valve.

19. A vacuum brake power booster as claimed in claim 1, characterized in that said connecting member is configured as an accommodating element for a vacuum connecting nozzle.

20. A vacuum brake power booster as claimed in claim 19, characterized in that said vacuum connecting nozzle is accommodated within said connecting member such as to be rotatable.

21. A vacuum brake power booster as claimed in claim 1, characterized in that the range of its coupling to said servo-cylinder said connecting member presents a non-circular configuration.

22. A vacuum brake power booster as claimed in claim 1, characterized in that at its outer circumference and in the range of its connection with said wall of said servo-cylinder, said connecting member is furnished with a buttoning-in collar presenting a saw tooth-shaped external profile, in that an elastic sealing plug is positioned between said opening in said wall of said servo-cylinder and said buttoning-in collar.

23. A vacuum brake power booster as claimed in claim 1, characterized in that said connecting member is configured as a vacuum connecting valve and is provided with a suction duct which ends up in a vacuum chamber, is positioned in a valve housing, and into which a movable element of said sensing device is introduced telescopingly, covering part of the cross sectional area of suction.

24. A brake power booster as claimed in claim 23, characterized in that said sensing device is positioned in said vacuum connecting valve which generates an electric output signal depending on the position of the said movable element.

25. A brake power booster as claimed in claim 24, characterized in that said sensing device is configured as a resistance track on which a slider slides which is driven by said movable element.

26. A vacuum brake power booster as claimed in claim 24, characterized in that said sensing device is provided with a plurality of contact surfaces which are separated from one another electrically and which in the event of a movement of the said movable element come in touch one after the other with a movable contact being driven by the said movable element.

27. A brake power booster as claimed in claim 23, characterized in that said movable element is prestressed by a first spring in the direction of its position of rest, in that in said movable element a telescopic element is positioned which is prestressed in the direction of its position of rest by a second spring acting in the same direction, and in that said second spring is much more rigid than said first spring.

28. A vacuum brake power booster as claimed in claim 37, characterized in that said vacuum connecting valve is provided with a suction nozzle which extends at a predetermined angle in respect of said suction duct, said suction nozzle being rotatable relative to said valve housing.

29. A vacuum brake power booster as claimed in claims 28, characterized in that an electric connecting device is provided which is fixed to said valve housing and which is rotatable into its fixing position in respect of said valve housing.

30. A vacuum brake power booster as claimed in claim 29, characterized in that said valve housing is furnished with a plurality of sliding contact rings which are electrically connected to said sensing device and in that said connecting device is provided with a corresponding number of sliding contacts which are adhering onto said sliding contact rings.

31. A brake power booster comprising:
   a servo-cylinder having a wall defining a portion of a housing of said servo-cylinder;
   a servo-piston located within said servo-cylinder housing;
   sensing means for detecting the position of said servo-piston within said servo-cylinder housing;
   and a sensing means housing containing at least a portion of said sensing means and positioned in said wall of said servo-cylinder housing to form a portion of said wall, wherein said sensing means housing includes a connecting member positioned in said wall of said servocylinder and through which servo-fluid passes.

32. A brake power booster according to claim 31 wherein said sensing means include:
   (a) a movable scanning member responsive to movement of said servo-piston,
   (b) a guide for said scanning member,
   (c) a gearing actuated by said scanning member, and
   (d) signal generating means actuated by said gearing for generating a sensor signal representative of movement of said servo-piston.

33. A brake power booster according to claim 32 wherein at least part of said guide, said gearing and said signal generating means are positioned within said connecting means.

34. A brake power booster according to claim 33 wherein said gearing includes:
   (a) a gear, and
   (b) a flexible toothed rack engaged by said gear.

35. A brake power booster according to claim 35 wherein said scanning member is a pin which is coupled to said flexible toothed rack and said guide is a telescoping unit through which said flexible toothed rack and said pin extend.

36. A brake power booster according to claim 35 further including spring means for urging said pin to maintain contact with said servo-piston.

37. A brake power booster according to claim 36 wherein said spring means include a helical spring acting upon said gearing.

38. A brake power booster according to claim 37 wherein said signal generating means include:
   (a) an ohmic resistance of circular arcshaped configuration located on said gear, and
   (b) a tapping member in contact with said ohmic resistance.

39. A brake power booster according to claim 35 wherein said signal generating means include a rotary potentiometer coupled to said gear.

40. A brake power booster according to claim 39 wherein said rotary potentiometer includes:
   (a) a baseplate fabricated of an electrically non-conductive material,
   (b) an ohmic resistance of circular arcshaped configuration located on said baseplate, and
   (c) a tapping member in contact with said ohmic resistance
said tapping member and said ohmic resistance adapted for circular arc-shaped relative movement.

41. A brake power booster according to claim 40 wherein said tapping member is rotatable by said gear.

42. A brake power booster according to claim 40 wherein said baseplate is rotatable by said gear.

43. A brake power booster according to claim 10 wherein said sensing means include a common shaft positioned within said connecting member and upon which said gear and said rotary potentiometer are mounted.

44. A brake power booster according to claim 43 wherein said connecting member includes a slide rail along which said flexible toothed rack moves.

45. A brake power booster according to claim 35, wherein said brake power booster defines an axis and said pin moves parallel to said axis.

46. A brake power booster according to claim 40 wherein said gear and said baseplate of aid potentiometer are formed as a single unit.

47. A brake power booster according to claim 31 further including a vacuum non-return valve positioned in said connecting member.

48. A brake power booster according to claim 31 further including a vacuum connecting nozzle positioned in said connecting member.

49. A brake power booster according to claim 48 wherein said vacuum connecting nozzle is rotatable relative to said connecting member.

50. A brake power booster according claim 31, wherein said connecting member includes a non-circular part which is positioned in said wall of said servocylinder.

51. A brake power booster according to claim 32 wherein said connecting member has a saw tooth-shaped external profile and said brake power booster further includes an elastic sealing plug interposed between said saw tooth-shaped external profile of said connecting member collar and said wall of said servo-cylinder.

52. A brake power booster according to claim 32 wherein:
   (a) said power brake booster has a vacuum chamber,
   (b) said connecting member is a vacuum connecting valve having a suction duct opening into said vacuum chamber, and
   (c) said sensing means include a telescoping unit extending through said suction duct.

53. A brake power booster according to claim 52 wherein said telescoping unit is positioned centrally within said suction duct.

54. A brake power booster according to claim 53 wherein said sensing means include:
   (a) a resistance track, and
   (b) a sliding element coupled to said telescoping unit and movable along said resistance track.

55. A brake power booster according to claim 53 wherein said sensing means include:
(a) a plurality of contact surfaces electrically isolated from one another, and
(b) a contact element coupled to said telescoping unit and movable from one of said contact surfaces to another.

56. A brake power booster according to claim 52 further including:
(a) a first spring urging said telescoping unit to move to its position of rest, and
(b) a second spring urging said telescoping unit to move to its position of rest said second spring being more rigid than said first spring.

57. A brake power booster according to claim 52 wherein said vacuum connecting valve includes a rotatably mounted suction nozzle extending at a predetermined angle relative to said suction duct.

58. A brake power booster according to claim 57 wherein said sensing means include an electric connecting device rotatable mounted on said vacuum connecting valve.

59. A brake power booster according to claim 58 wherein said vacuum connecting valve includes a plurality of sliding contact rings electrically connected to said sensing means and said electric connecting device includes a corresponding number of sliding contacts coupled to said sliding rings.

* * * * *

UNITED STATES PATENT AND TRADEMARK OFFICE
CERTIFICATE OF CORRECTION

PATENT NO.  :  5,224,410
DATED       :  July 6, 1993
INVENTOR(S) :  Kai-Michael Graichen, Christof Kornas It is certified that error appears in the above—identified patent and that said Letters Patent is hereby corrected as shown below:

```
Col. 10, line 68 - Change "lest" to --least--
Col. 11, line  9 - Change "2" to --23--
Col. 11, line 29 - Change "1" to --6--
Col. 11, line 36 - Delete "the"
Col. 11, line 56 - Delete "the"
Col. 12, line  5 - Change "hosing" to --housing--
Col. 13, line  1 - Delete "vacuum"
Col. 13, line  2 - Change "37" to --27--
Col. 13, line  7 - Delete "vacuum"
Col. 13, line 12 - Delete "vacuum"
Col. 13, line 31 - Change "servocylinder" to --servo-cylinder--
Col. 13, line 50 - Change "35" to --34--
Col. 13, line 63 - Change "arcshaped" to --arc-shaped--
Col. 14, line  1 - Change "35" to --34--
Col. 14, line  8 - Change "arcshaped" to --arc-shaped--
Col. 14, line 18 - Change "10" to --40--
Col. 14, line 30 - Change "aid" to --said--
Col. 14, line 43 - Change "servocylinder" to --servo-cylinder--
Col. 14, line 45 - Change "32" to --31--
```

UNITED STATES PATENT AND TRADEMARK OFFICE
CERTIFICATE OF CORRECTION

PATENT NO. : 5,224,410
DATED : July 6, 1993
INVENTOR(S) : Kai-Michael Graichen, Christof Kornas It is certified that error appears in the above-indentified patent and that said Letters Patent is hereby corrected as shown below:

Col. 14, line 52 - Change "32" to --31--

Signed and Sealed this

Third Day of May, 1994

Attest:

BRUCE LEHMAN

Attesting Officer     Commissioner of Patents and Trademarks